United States Patent
Sun et al.

(10) Patent No.: US 8,275,078 B2
(45) Date of Patent: Sep. 25, 2012

(54) METHOD AND APPARATUS FOR SIGNAL DETECTION

(75) Inventors: Yanmeng Sun, Shanghai (CN);
Liangliang Hu, Shanghai (CN)

(73) Assignee: ST-Ericsson SA, Plan-les-Ouates (CH)

( * ) Notice: Subject to any disclaimer, the term of this patent is extended or adjusted under 35 U.S.C. 154(b) by 649 days.

(21) Appl. No.: 12/308,539

(22) PCT Filed: Jun. 20, 2007

(86) PCT No.: PCT/IB2007/052388
§ 371 (c)(1),
(2), (4) Date: Oct. 16, 2009

(87) PCT Pub. No.: WO2008/038164
PCT Pub. Date: Apr. 3, 2008

(65) Prior Publication Data
US 2010/0183103 A1    Jul. 22, 2010

(30) Foreign Application Priority Data
Jun. 28, 2006   (CN) .......................... 2006 1 0093885

(51) Int. Cl.
G06F 17/15     (2006.01)

(52) U.S. Cl. ...................................... 375/343; 708/422

(58) Field of Classification Search .................. 375/142, 375/150, 343; 708/422, 423, 425
See application file for complete search history.

(56) References Cited

U.S. PATENT DOCUMENTS

| | | | | |
|---|---|---|---|---|
| 4,937,775 | A * | 6/1990 | Engeler et al. | 708/422 |
| 5,365,549 | A | 11/1994 | Kazecki | |
| 6,237,014 | B1 * | 5/2001 | Freidin et al. | 708/422 |
| 7,039,091 | B1 * | 5/2006 | Mauer | 375/140 |
| 2002/0051487 | A1 | 5/2002 | Yamada et al. | |

OTHER PUBLICATIONS

International Search Report dated Dec. 5, 2007 in connection with PCT Patent Application No. PCT/IB2007/052388.

* cited by examiner

*Primary Examiner* — David B. Lugo
(74) *Attorney, Agent, or Firm* — Howison & Arnott, L.L.P.

(57) ABSTRACT

In order to reduce the complexity of complex signal correlator and realize algorithm optimization, the present invention provides a method and an apparatus for implement complex signal correlation by means of shifter and adder instead of complex multiplier. In the method, the amplitude and radial angle of a corresponding received symbol is firstly adjusted based on a pre-stored local reference symbol. Then, the radial angle of the adjusted received signal is rotated based on a corresponding interchange indicator. Finally, all the processed received signals are combined to obtain a final complex correlation signal. With this method, the chip size and computing load can be greatly reduced.

20 Claims, 5 Drawing Sheets

METHOD AND APPARATUS FOR SIGNAL DETECTION

CROSS-REFERENCE TO RELATED APPLICATION(S)

The present application claims priority under 35 U.S.C. §365 to International Patent Application No. PCT/IB2007/052388 filed Jun. 20, 2007, entitled "METHOD AND APPARATUS FOR SIGNAL DETECTION". International Patent Application No. PCT/IB2007/052388 claims priority under 35 U.S.C. §365 and/or 35 U.S.C. §119(a) to Chinese Patent Application No. 200610093885 filed Jun. 28, 2006 and which are incorporated herein by reference into the present disclosure as if fully set forth herein.

BACKGROUND OF THE INVENTION

1. Field of Invention

The present invention relates to a communication system, and more particularly to a method and an apparatus for correlating complex number signals.

2. Description of Prior Art

In an existing communication system, in order to fulfill some basic functions, such as synchronization, channel estimation and the like, a receiver needs to correlate one received signal with one local reference signal to detect a correlation peak, thereby detecting a synchronization start and obtaining, for example, channel estimation. The received signal is usually obtained from a transmitted signal which has undergone channel transmission and local processing, such as RF (radio frequency) sampling, down conversion and A/D (analog-to-digital) conversion. The transmitted signal contains one special sequence, for example, a preamble or a trained sequence. Having experienced channel transmission and local processing, the special sequence forms part of the received signal. In addition, the special sequence is usually known to both of the transmitter and the receiver and pre-stored in the receiver as the local reference signal. Both the received signal and the local reference signal are generally complex number signals, that is, each symbol contained in the signals can be expressed by a complex number. The received signal R can be expressed as $\{R[i]=R_{Re}[i]+jR_{Im}[i], i=\{1, 2, \ldots\}\}$, and the local reference signal L can be expressed as $\{L[l]=L_{Re}[l]+jL_{Im}[l], l=\{1, 2, \ldots\}\}$, where $R_{Re}[i]$ and $L_{Re}[l]$ represent the real parts of the complex number symbols $R[i]$ and $L[l]$, respectively, and $R_{Im}[i]$ and $L_{Im}[l]$ represent the imaginary parts of the complex number symbols $R[i]$ and $L[l]$, respectively. In a conventional solution, the receiver performs complex number correlation on the received signal and the local reference signal so as to detect the correlation peak. The correlation operation on complex signal can be decomposed into a plurality of complex multiplications of two complex number symbols, and each complex multiplication can be further denoted as four real multiplications and two additions or subtractions, as shown in the following equation (1):

$$R[m] \times L[n] = (R_{Re}[m] + jR_{Im}[m]) \times (L_{Re}[n] + jL_{Im}[n]) \quad (1)$$
$$= (R_{Re}[m] \times L_{Re}[n] - R_{Im}[m] \times L_{Im}[n]) +$$
$$j(R_{Re}[m] \times L_{Im}[n] + R_{Im}[m] \times L_{Re}[n])$$

wherein $R[m]$ and $L[n]$ represent complex number symbols of the received signal and the local reference signal, respectively, $R_{Re}[m]$ and $R_{Im}[m]$ represent real part and imaginary part of the complex number symbol $R[m]$, respectively, and $L_{Re}[n]$ and $L_{Im}[n]$ represent real part and imaginary part of the complex number symbol $L[n]$, respectively.

The disadvantages usually incurred by implementing multiplication in hardware are that it takes a large area, consumes a high current and leads to expensive chip cost. In U.S. Pat. No. 5,365,549, proposed by Motorola and granted in November, 1994, a correlator and correlation method for complex signal are provided to perform complex correlation on one complex sampled signal and one reference signal so as to generate one complex correlation signal. In this method, the position of the reference signal relative to a real axis and an imaginary axis is determined at first, and the sampled signal is processed based on the determined position to generate real ad imaginary processed components. Next, the complex correlation signal is acquired by combining the real ad imaginary processed components. In this method, each multiplier is replaced with an adder, and hence the complex signal correlator is endowed with reduced complexity.

In order to reduce operation complexity and chip size, it is necessary to provide a correlation method and an apparatus thereof for complex signal, which can perform correlation on arbitrary complex signal, i.e., complex signal with arbitrary amplitude and radial angle.

SUMMARY OF THE INVENTION

The present invention provides a correlation method for complex signal and an apparatus thereof.

According to one embodiment of the present invention, a correlation method for complex signal is provided for processing one received signal to obtain one complex correlation signal, which comprises steps of, for each received symbol in the received signal, adjusting respectively the amplitude and radial angle of the received symbol based on one corresponding local reference symbol in one corresponding local reference signal so as to generate one corresponding adjusted received symbol; rotating the radial angle of each adjusted received symbol based on one corresponding interchange indicator so as to generate one corresponding processed received symbol; and combining all processed received symbols to obtain one complex correlation signal.

Alternatively, according to one embodiment of the present invention, the adjusting operation can be realized by means of shifting, that is, based on the real part and the imaginary part of the local reference symbol, adjusting respectively the real part and the imaginary part of the received symbol by means of shifting so as to generate the amplitude and radial angle of adjusted received symbol.

Alternatively, according to one embodiment of the present invention, the real part and the imaginary part of each adjusted received symbol are interchanged for rotation based on one corresponding interchange indicator so as to adjust said radial angle of the adjusted received symbol.

According to one embodiment of the present invention, it is not required that the local reference signal must be a special sequence known to both a transmitter and a receiver and contained in a transmitted signal. Instead, the local reference signal can be a complex signal which is pre-calculated and pre-stored for the implementation of the method and apparatus in the present invention.

Alternatively, one embodiment of the present invention provides one known signal including a plurality of known symbols. The known signal is commonly known to both a transmitter and a receiver and the same as a special sequence contained in a transmitted signal. according to this embodiment, the method of the present invention further comprises steps of determining the position of each known symbol relative to a real axis and an imaginary axis in a complex plane; deciding the value of one corresponding interchange indicator based on the determined position; calculating one local reference symbol corresponding to the known symbol based on the real and imaginary parts of the known symbol as well as the determined position. With the above steps in the embodiment, it is possible to calculate a local reference symbol suited for the method and apparatus in the present invention from one known signal.

Alternatively, the one known symbol can be rotated to the closest real or imaginary axis by means of rotation to determine its position.

Alternatively, the one corresponding interchange indicator is assigned with different values based on difference in the determined position of the one known symbol, and the corresponding radial angle of the adjusted received signal is rotated based on the value.

Alternatively, the intermediate real and imaginary parts of the one corresponding local reference symbol is first calculated based on the real and imaginary parts of the one known symbol. Then, based on the determined position of the known symbol, the polarities of the intermediate real and imaginary parts are reversed or maintained, respectively, from which the results are used as the real and imaginary parts of the local reference symbol, respectively.

According to one embodiment of the present invention, a complex signal correlator is provided comprising a first memory, a second memory, one processor and one complex signal synthesizer, wherein the first and second memories are configured to store one received signal and one local reference signal, respectively; the processor comprises a plurality of shifters and a plurality of interchangers, every two shifters are grouped, as a pair and configured to adjust respectively the amplitude and radial angle of the received symbol based on the local reference symbol so as to generate correspondingly one adjusted received symbol, and each interchanger is configured to rotate the radial angle of the adjusted received symbol based on the value of one corresponding interchange indicator so as to generate one processed received symbol; and the complex signal synthesizer is configured to combine all real and imaginary processed parts to obtain one complex correlation signal.

Alternatively, according to one embodiment of the present invention, the complex signal correlator further comprises a third memory, one position determiner, a first calculator and a second calculator. The third memory is configured to store the known signal. The position determiner is configured to determine the position of each known symbol relative to the real and imaginary axes. The first calculator is configured to calculate the real and imaginary parts of the one corresponding local reference signal based on the real and imaginary parts and the determined position of each known symbol. The second calculator is configured to calculate the value of the one corresponding interchange indicator based on the determined position.

One embodiment of the present invention further provides a structure of a receiver including the above complex signal correlator.

The basic idea of the present invention is to implement correlation for complex signal by means of shifter and adder instead of complex multiplier. Moreover, according to one embodiment of the present invention, computing load can be further reduce by optimizing the local reference signal calculated from one sequence known to both a receiver and a transmitter.

The method disclosed in U.S. Pat. No. 5,365,549 is adapted to some training sequences with specific amplitude and radial angle, such as unit vector or sign sequence, for example, {1, −1, j, −j}, {0, 1, −1, j, −j, 1+j, 1−j, −1+j, −1−j}.

Compared with the method in U.S. Pat. No. 5,365,549, the methods according to the respective embodiments of the present invention are applicable to not only a unit vector or a sign sequence but also to any other training sequences with arbitrary amplitude and radial angle, such as those specified in IEEE 802.11a. Alternatively, the local reference signal can be obtained from a known signal through pre-calculation, and hence it is unnecessary to store the known signal in the receiver, which leads to reduced chip size and computing load.

Other objects and effects of the present invention will become more apparent and readily understood by referring to the following description in connection with accompanying figures and content in the Claims and along with more comprehensive recognition to the present invention.

Throughout the figures, same or like reference signs denote same or like functions and features.

DETAILED DESCRIPTION OF PREFERRED EMBODIMENTS

In an existing communication system, some special sequences, for example, preamble, training sequence or midamble, are widely applied in order to such functions as synchronization, channel estimation, etc. Some sequences, such as unit vector or sign sequence, consist of symbols whose amplitudes and radial angles conform to certain rules, while symbols in other sequences, for example, the following short sequence used in IEEE 802.11a, have no obviously regular amplitude and radial angle:

[0.046+0.046j, −0.132+0.002j, −0.013−0.079j, 0.143−0.013j, 0.092, 0.143−0.013j, −0.013−0.079j, −0.132+0.002j, 0.046+0.046j, 0.002−0.132j, −0.079−0.013j, −0.013+0.143j, 0.092j, −0.013+0.143j, −0.079−0.013j, 0.002−0.132j]

Other systems, such as IEEE 802.11n, IEEE 802.16 and the like, also employ training sequences having no obviously regular amplitude and radial angle. The method and apparatus of the present invention are applicable to training sequences with or without obviously regular amplitude and radial angle.

Generally, a receiver receives a modulated signal which has undergone channel attenuation and performs local processing, such as RF sampling, down conversion, sampling and A/D conversion, on the signal so as to generate a received signal. The modulated signal includes a known special sequence, for example, a training sequence. The special sequence is also subjected to channel attenuation and the local processing by the receiver, and then the result forms part of the received signal. Meanwhile, the receiver itself stores a local reference signal. The received and local reference signals are both complex signals in which each included symbol can be represented as a complex number having real and imaginary parts. The receiver detects correlation peak by use of the correlation between the local reference and the received signals, and the common approach of correlation peak judgment is to perform complex correlation on the two signals.

A complex signal correlator performs complex correlation on the received and the local reference signals to acquire a complex correlation signal. In the method of the to present invention, the complex correlation is implemented with shifter and adder instead of complex multiplier. In one embodiment of the present invention, the local reference signal can be calculated from a known signal, which is known to both the transmitter and the receiver and included in a transmitted signal sent by the transmitter. In another embodiment of the present invention, the local reference signal can be calculated in advance, consequently, there is no need to store the known signal, thereby reducing the computing load and improving system performance. It should be noted that the local reference signal can be either the shared known signal or different from the known signal in the method and apparatus of the present invention.

Figure 1:
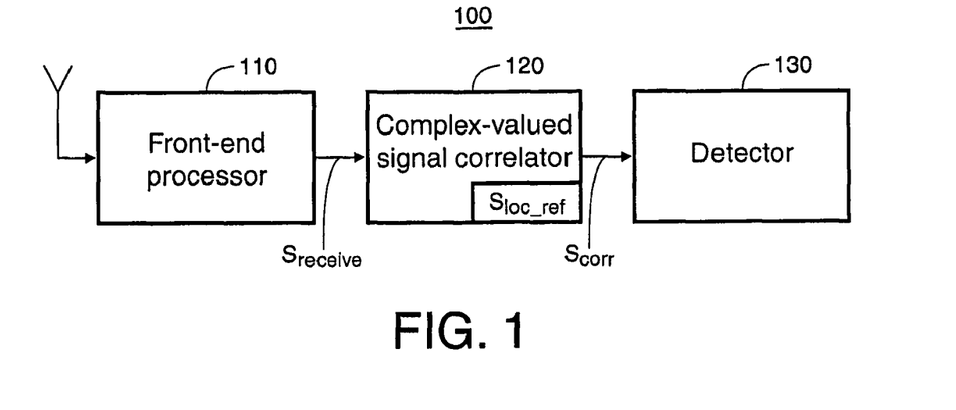
FIG. 1 shows a block diagram for a receiver comprising a complex signal correlator according to one embodiment of the present invention.

FIG. 1 shows a block diagram for a receiver comprising a complex signal correlator according to one embodiment of the present invention. The receiver 100 includes a front-end processor 110, a complex signal correlator 120 and a detector 130. The front-end processor 110 is provided for local processing, such as down conversion, sampling and A/D conversion, in order to process a received RF signal into a received signal $S_{receive}$ for complex correlation. The complex signal correlator 120 is provided to perform complex correlation on the received signal $S_{receive}$ and a pre-stored local reference signal $S_{local\_ref}$ so as to generate a complex correlation signal $S_{corr}$. The detector 130 is provided to detect the complex correlation signal $S_{corr}$ so as to judge correlation peak. To facilitate the following description, other functions and modules of the receiver that are not directly related to the method and apparatus of the present invention are omitted.

Figure 2:
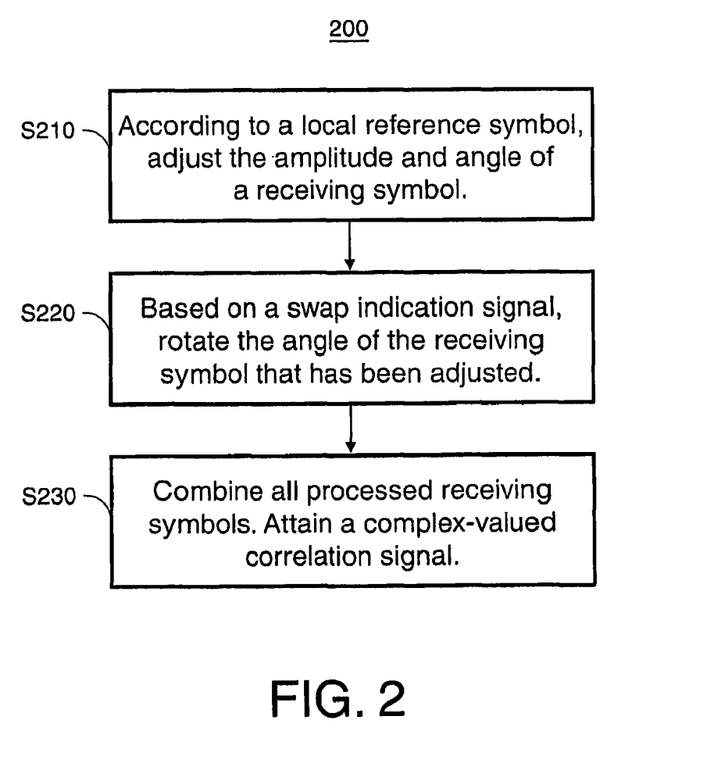
FIG. 2 shows a flowchart of a method for correlating complex signal according to one embodiment of the present invention.

FIG. 2 shows a flowchart of a method for complex correlation on a received signal and a local reference signal according to one embodiment of the present invention. The received signal comprises a plurality of received symbols, and the local reference signal comprises a plurality of local reference symbols. In the method 200, for each received symbol of the received signal, its real and imaginary parts are adjusted in the first step S210 based on a corresponding local reference symbol in order to adjust its amplitude and radial angle and hence obtain an adjusted received symbol. Then, the radial angle of each adjusted received symbol is rotated in the step S220 based on a corresponding interchange indicator so as to generate a corresponding processed received symbol. The rotation for respective adjusted received symbols aims to optimize the final result of the overall correlation. In the step S230, all the processed received signals are combined to generate a complex correlation signal, which is exactly the result obtained by correlating the received signal with the local reference signal.

Figure 3:
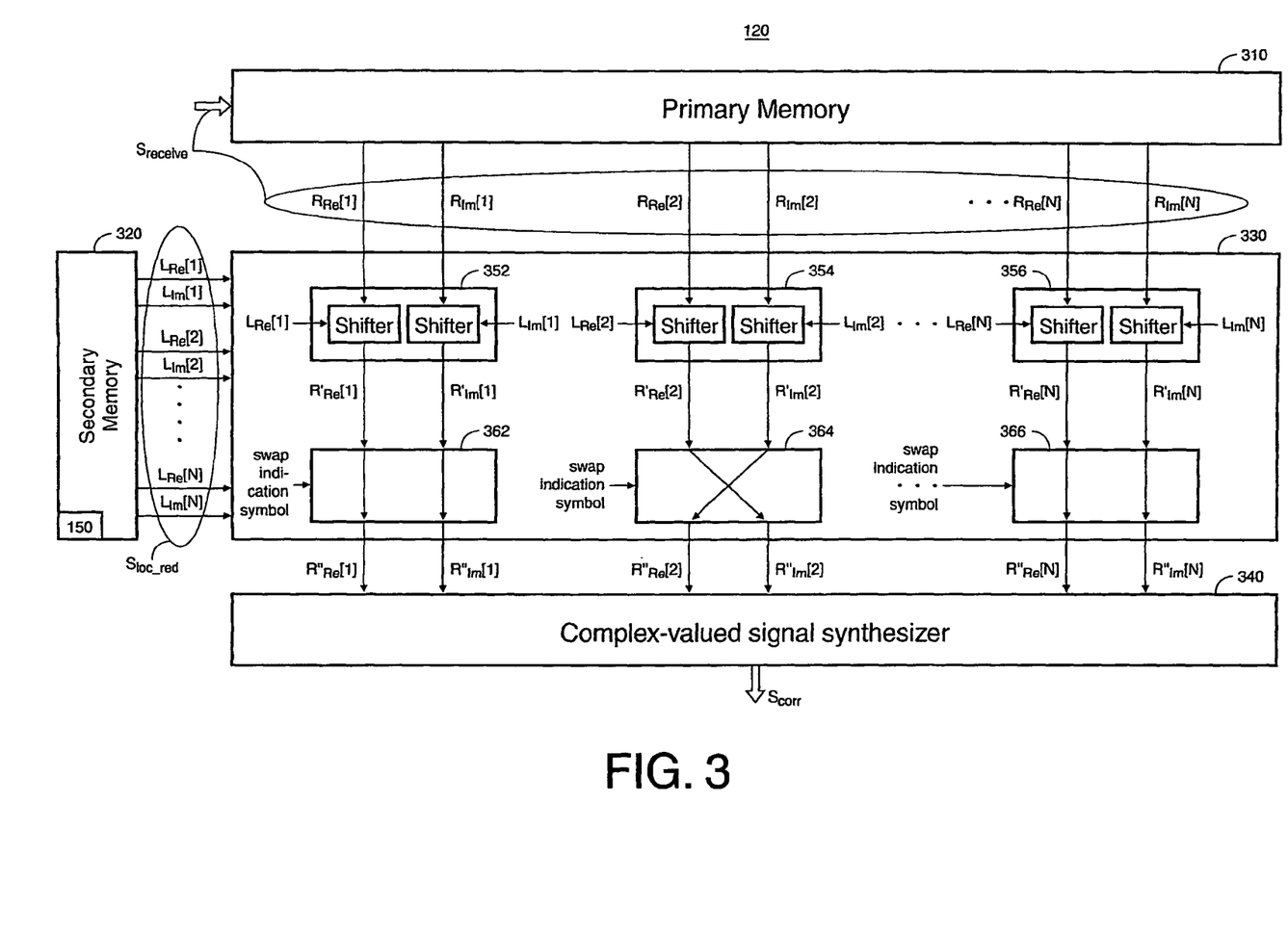
FIG. 3 shows a complex signal correlator according to one embodiment of the present invention.

FIG. 3 shows a complex signal correlator according to one embodiment of the present invention. The complex signal correlator 120 comprises a first memory 310, a second memory 320, a processor 330 and a complex signal synthesizer 340. The first and second memories 310 and 320 store a received signal $S_{receive}$ including a plurality of received symbols represented in complex number and a local reference signal $S_{local\_ref}$ including a plurality of local reference symbols represented in complex number, respectively. The processor 330 comprises several pairs of shifters, such as the pairs of shifters 352, 354 and 356, and several interchangers, such as 362, 364 and 366. Each pair of shifters includes two shifters, one shifter for receiving the real parts of a received symbol and a corresponding local reference symbol and the other one for receiving the imaginary parts of the received and the local reference symbols. Each pair of shifters adjusts the real and imaginary parts of the received symbol, respectively, based on the real and imaginary parts of the local reference symbol so as to generate an adjusted received symbol. Each of the interchangers receives a corresponding adjusted received signal, rotates its radial angle based on the value of a corresponding interchange indicator, for example, deciding whether to interchange the real and imaginary parts of the adjusted received signal based on the value of the interchange indicator, and output the adjusted result as processed real and imaginary parts. The complex signal synthesizer combines all the processed real and imaginary part components to generate a complex correlation signal $S_{corr}$.

In the embodiment as shown in FIG. 3, the first memory 310 outputs the plurality of received symbols R[i], i={1, 2, ... N}, each of R[i] having real and imaginary parts denoted as $R_{Re}[i]$ and $R_{Im}[i]$, respectively. The second memory 320 outputs the to plurality of local reference symbols L[j], j={1, 2, ... N}, each of L[j] having real and imaginary parts denoted as $L_{Re}[j]$ and $L_{Im}[j]$, respectively. N represents the number of the local reference symbols.

In the processor 330, a pair of shifters 352 receives R[1] and L[1], with one shifter for $R_{Re}[1]$ and $L_{Re}[1]$ and the other for $R_{Im}[1]$ and $L_{Im}[1]$. In the same way, a pair of shifters 354 receives R[2] and L[2], and a pair of shifters 356 receives R[N] and L[N]. Each shifter adjusts the real/imaginary part of the received symbol based on the real/imaginary part of the reference symbol, for example, the pair of shifters 352 adjusts the value of $R_{Re}[1]$ based on the value of $L_{Re}[1]$, for example, shifting $R_{Re}[1]$ left by $L_{Re}[1]$ bits if $L_{Re}[1]>0$, shifting $R_{Re}[1]$ right by $|L_{Re}[1]|$ bits if $L_{Re}[1]<0$, and remaining $R_{Re}[1]$ as it is if $L_{Re}[1]=0$. In the same manner, the pair of shifters 352 adjusts the value of $R_{Im}[1]$ based on the value of $L_{Im}[1]$. The adjustment on R[1] by the pair of shifters 352 results in the adjusted R'[1] denoted as $R'_{Re}[1]$ and $R'_{Im}[1]$.

The interchanger receives $R'_{Re}[1]$ and $R'_{Im}[1]$, and interchanges $R'_{Re}[1]$ and $R'_{Im}[1]$ based on the value of an interchange indicator. For example, the value of the interchange indicator is 0 for the interchanger 262, so it keeps $R'_{Re}[1]$ and $R'_{Im}[1]$ not changed and assigns $R''_{Re}[1]=R'_{Re}[1]$ and $R''_{Im}[1]=[1]$; while the value of the interchange indicator is 1 for the interchanger 264, so it interchanges $R'_{Re}[2]$ with $R'_{Im}[2]$ and assigns $R''_{Re}[2]=R'_{Im}[2]$ and $R''_{Im}[2]=R'_{Re}[2]$. $R''_{Re}[i]$ and $R''_{Im}[i]$ are outputted as processed real and imaginary parts for R[i], respectively, where i={1, 2, ... N}. By interchanging the real and imaginary parts of the adjusted received symbol, the interchanger fulfills the rotation of the radial angle of the adjusted received symbol. It should be appreciated by those skilled in the art that the interchange indicator can be calculated in advance, so the relationship between the two inputs and the two outputs of corresponding interchangers can be predetermined, that is, it is possible to predetermine whether the real and imaginary parts of the processed received symbol need to be interchanged. In this case, since the interchange indicator doesn't exist explicitly in the apparatus, it is only optional for this embodiment.

The complex signal synthesizer 340 receives all the adjusted real and imaginary part components, such as $\{R''_{Re}[1], R''_{Im}[1]\}, \{R''_{Re}[2], R''_{Im}[2]\}, \ldots, \{R''_{Re}[N], R''_{Im}[N]\}$, and combines them into the complex correlation signal $S_{corr}$.

Figure 4A:
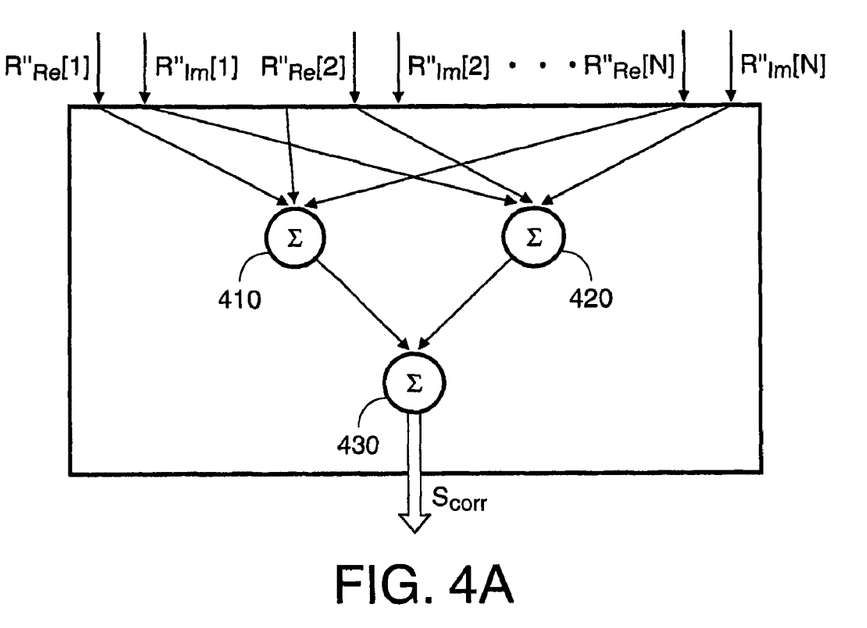
FIG. 4A shows a block diagram for a complex signal synthesizer according to one embodiment of the present invention.

FIG. 4A shows a block diagram for a complex signal synthesizer according to one embodiment of the present invention. The complex signal synthesizer 340 comprises a first adder 410, a second adder 420 and a complex signal synthesizer 430. The first adder 410 combines all the processed real part component, such as $R''_{Re}[1], R''_{Re}[2], \ldots, R''_{Re}[N]$, to obtain a real part component as the real part of the complex correlation signal $S_{corr}$. The second adder 420 combines all the processed imaginary part components, such as $R''_{Im}[1], R''_{Im}[2], \ldots, R''_{Im}[N]$, to obtain an imaginary part component as the imaginary part of the complex correlation signal $S_{corr}$. The complex signal synthesizer 430 combines the real and imaginary part components to generate the complex correlation signal $S_{corr}$.

Figure 4B:
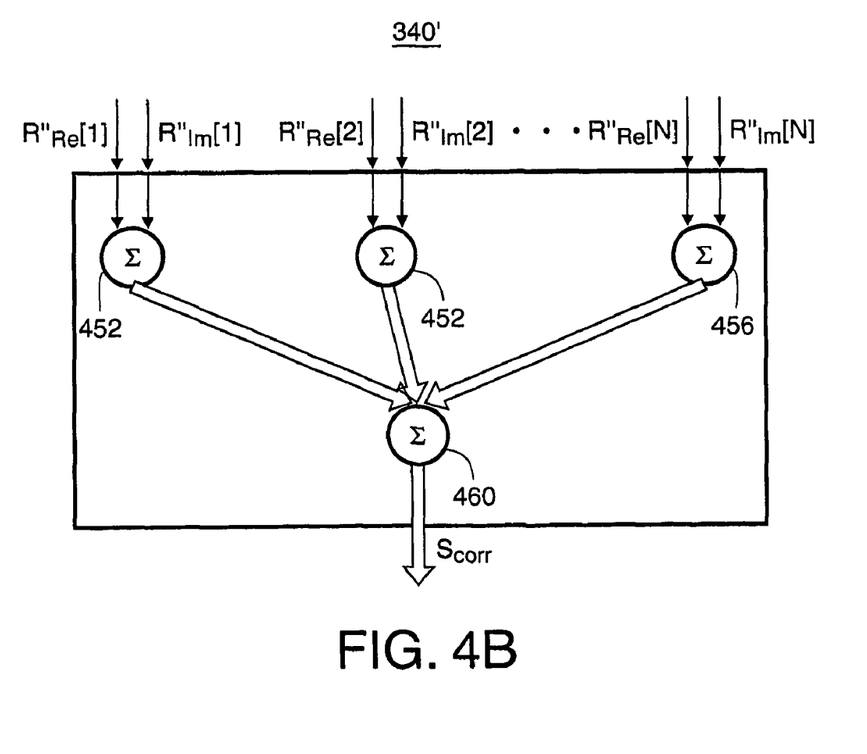
FIG. 4B shows a block diagram for a complex signal synthesizer according to one embodiment of the present invention.

To those skilled in the art, it should be understood that, in addition to the embodiment as shown in FIG. 4A, the scope of the present invention also encompasses any other complex signal synthesizer and method thereof by combining several processed real and imaginary part components into a complex correlation signal. FIG. 4B shows a block diagram for a complex signal synthesizer 340' according to another embodiment of the present invention. The complex signal synthesizer 340' comprises a plurality of complex signal synthesizers, such as 452, 454, 456, and one complex signal adder 460. Each of the complex signal synthesizers combines the adjusted real and imaginary part components, that corresponds to one same received symbol, to generate one intermediate complex signal, for example, 452 combines $R''_{Re}[1]$ and $R_{Im}[1]$, and 454 combines $R''_{Re}[2]$ and $R''_{Im}[2]$. The complex signal adder 460 combines all the intermediate complex signals so as to obtain the complex correlation signal $S_{corr}$.

The local reference signal $S_{local\_ref}$ is calculated in advance in the embodiments as shown in FIGS. 4A and 4B. In another embodiment of the present invention, a method and apparatus are provided to calculate the local reference signal from a signal known to both the receiver and the transmitter.

Figure 5:
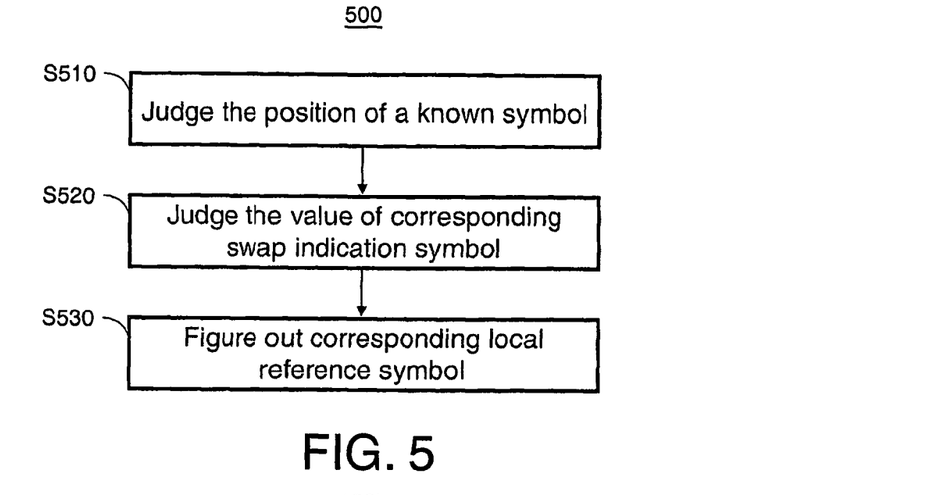
FIG. 5 shows a flowchart of a method for calculating a local reference signal based on one known signal according to one embodiment of the present invention.

FIG. 5 shows a flowchart of a method for calculating a local reference signal based on a known signal according to one embodiment of the present invention. The known signal includes a plurality of known symbols. In the method 500, the position of a known symbol is first determined relative to the real and imaginary axes in a complex plane (S510). Then the value of a corresponding interchange indicator is determined based on the determined position (S520). In the step S530, the real and imaginary parts of a corresponding local reference symbol are calculated from the real and imaginary parts of the known symbol and the determined position. By processing every known symbol, the real and imaginary parts of all the local reference symbols and hence the local reference signal can be obtained.

Figure 6:
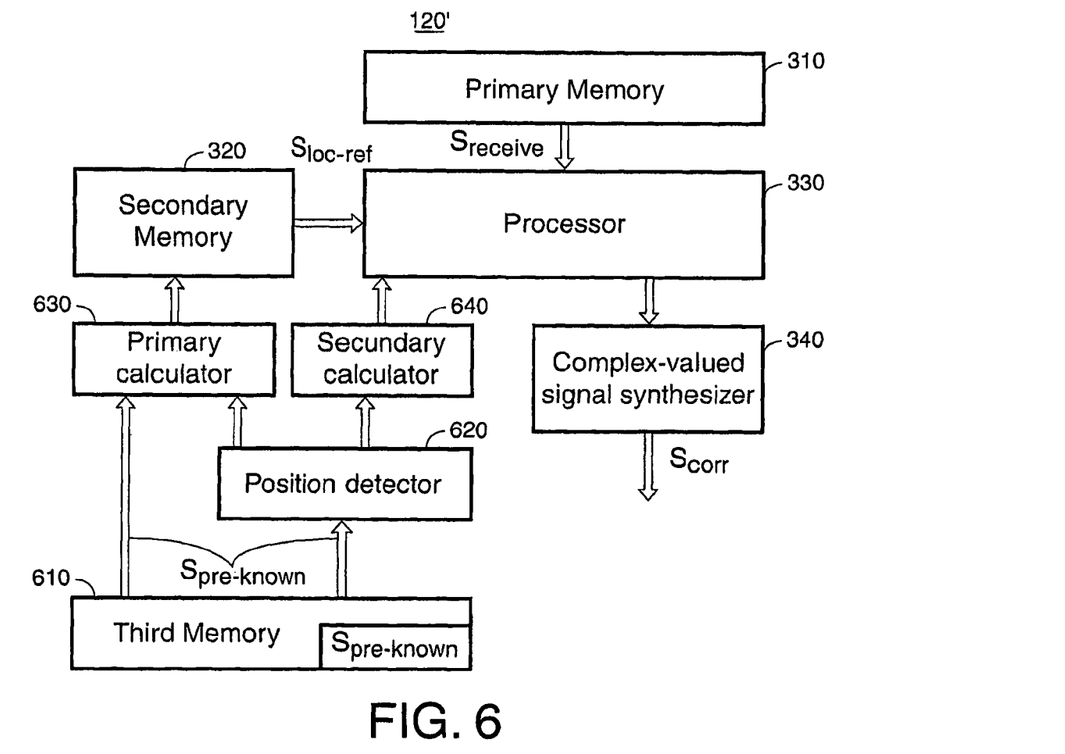
FIG. 6 shows a block diagram for a complex signal correlator according to one embodiment of the present invention.

FIG. 6 shows a block diagram for a complex signal correlator according to one embodiment of the present invention. The complex signal correlator 120' further comprises a third memory 610, a position determiner 620, a first calculator 630 and a second calculator 640. The third memory 610 stores a signal $S_{pre-known}$ known to both the receiver and the transmitter. The known $S_{pre-known}$ contains a plurality of known symbols, of which each can be represented with real and imaginary parts, for example, the known symbol can be the above-described short training sequence utilized in IEEE 802.11a. In a physical system, the transmitted signal containing the known signal $S_{pre-known}$ by the transmitter is subjected to channel transmission and local processing of the receiver to generate the received signal $S_{receive}$, which includes a section of the signal having possible distortion due to the channel transmission and local processing for the known signal $S_{pre-known}$. The position determiner 620 is designed to determine the position of each known symbol relative to the real and imaginary axes. The first calculator 630 calculates the real and imaginary parts of a corresponding local reference symbol from the real and imaginary parts of the known symbol and the determined position. The second calculator 640 the value of a corresponding interchange indicator based on the determined position of each known symbol, and each interchange indicator is utilized by a corresponding interchanger to judge whether to interchange the real and imaginary part components which have been received and adjusted.

Figure 7:
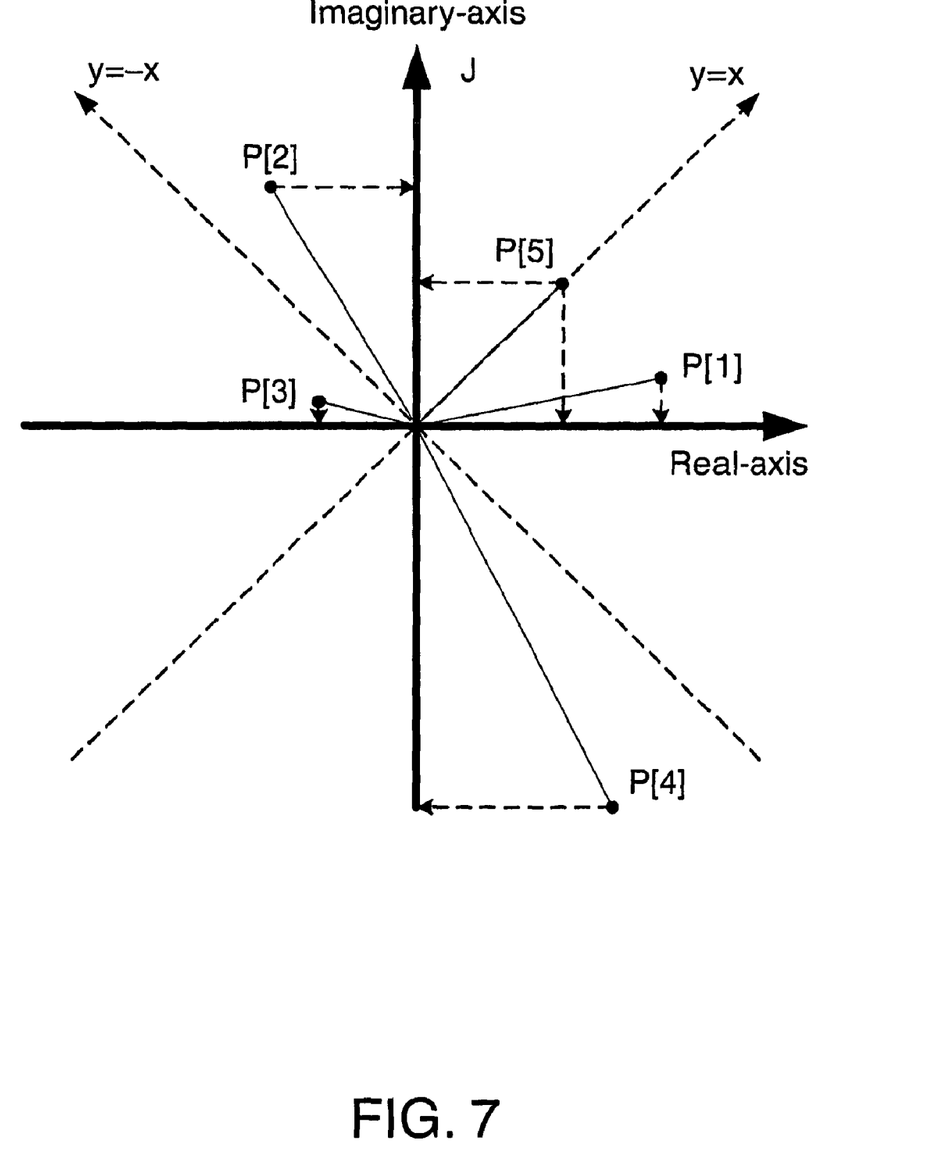
FIG. 7 shows a method for determining the position of a known signal according to one embodiment of the present invention.

As described previously, the method and apparatus of the present invention are applicable to sequences with or without regular amplitude and radial angle. FIG. 7 shows a method for determining the position of a known signal with arbitrary amplitude and radial angle according to one embodiment of the present invention. In FIG. 7, the radial angle of a known symbol P[1] lies in the range of (315°, 360°] and [0°, 45°) and at the shortest distance from the positive part of the real axis, and the determined position of P[1] can be represented with "1". The radial angle of a known symbol P[2] lies in the range of (45°, 135°) and at the shortest distance from the positive part of the imaginary axis, and the determined position of P[2] can be represented with "j". The radial angle of a known symbol P[3] lies in the range of (135°, 225°) and at the shortest distance from the negative part of the real axis, and the determined position of P[3] can be represented with "−1". The radial angle of a known symbol P[4] lies in the range of (225°, 315°) and at the shortest distance from the negative part of the imaginary axis, and the determined position of P[4] can be represented with "−j". For a known symbol with an angle of 45°, 135°, 225° or 315°, i.e., a known symbol in the line y=x or y=−x, its position can be determined by means of clockwise or counter-clockwise rotation. For example, when rotated in a clockwise direction, the position of the known symbol P[5] having a radial angle of 45° is determined as "1", while the determined position of P[5] is "j" in the case of counter-clockwise rotation.

Generally, it is easy to detect correlation peak when there exists high correlation between the known signal and the received signal. The basic idea for the first calculator 630 is to select proper real and imaginary parts for the local reference signal based on the signal known to both the transmitter and the receiver so as to enhance the correlation between the local reference signal and the received signal.

From the real and imaginary parts for each known symbol, the first calculator 630 first calculates the intermediate real and imaginary parts for a corresponding local reference symbol. In an embodiment of the present invention, the first calculator 630 calculates the intermediate real and imaginary parts of a local reference symbol by the following equation (2).

$$L'_{Re}[i] = L'_{Im}[i] = \lceil \log_2 |P[i]| \rceil = \lceil \log_2(\sqrt{P_{Re}^2[i] + P_{Im}^2[i]}) \rceil, i = \{1, 2, \ldots\} \quad (2)$$

where P[i] represents a known symbol, |P[i]| represents the amplitude of P[i], and ⌈X⌉ represents the minimum integer equal to or greater than X. The intermediate real part $L'_{Re}[i]$ and the intermediate imaginary part $L'_{Im}[i]$ are the same for the local reference symbol.

In an embodiment of the present invention, the first calculator 630 calculates the intermediate real and imaginary parts of a local reference symbol by the following equation (3).

$$L'_{Re}[i] = \lceil \log_2|P_{Re}[i]| \rceil \text{ and } L'_{Im}[i] = \lceil \log_2|P_{Im}[i]| \rceil, \quad i=\{1, 2, \ldots\} \quad (3)$$

As described above, the present invention provides two embodiments for calculating the intermediate real and imaginary parts of a local reference symbol. Those skilled in the art should understand, however, that any other method for optimizing the correlation between a local reference signal and a received signal also falls into the scope of the present invention.

After obtaining $L'_{Re}[i]$ and $L'_{Im}[i]$, the first calculator 630 further decides whether to reverse the polarities for the intermediate real and imaginary parts according to the determined position of the known symbol.

Table 1 shows schematically the relationship between the real and imaginary parts of a local reference symbol, an interchange indicator and the determined position of a corresponding known symbol.

TABLE 1

| DETERMINED POSITION | $L_{Re}[i]$ | $L_{Im}[i]$ | INTERCHANGE INDICATOR |
|---|---|---|---|
| 1 | $L_{Re}'[i]$ | $L_{Im}'[i]$ | 0 |
| −1 | $−L_{Re}'[i]$ | $−L_{Im}'[i]$ | 0 |
| j | $L_{Re}'[i]$ | $−L_{Im}'[i]$ | 1 |
| −j | $−L_{Re}'[i]$ | $L_{Im}'[i]$ | 1 |

In the embodiment as shown in Table 1, by way of example, when the determined position of a known symbol P[i] is "1", the intermediate real part $L'_{Re}[i]$ and the intermediate imaginary part $L'_{Im}[i]$ of the local reference symbol L[i] are kept unchanged in terms of polarity and used as the real and imaginary parts $L_{Re}[i]$ and $L_{Im}[i]$ for L[i], respectively, i.e., $L_{Re}[i]=L'_{Re}[i]$ and $L_{Im}[i]=L'_{Im}[i]$. When the determined position of a known symbol P[i] is "−1", the intermediate real part $L'_{Re}[i]$ and the intermediate imaginary part $L'_{Im}[i]$ of L[i] are reversed in terms of polarity and used as the real and imaginary parts $L_{Re}[i]$ and $L_{Im}[i]$ for L[i], respectively, i.e., $L_{Re}[i]=-L'_{Re}[i]$ and $L_{Im}[i]=-L'_{Im}[i]$. When the determined position of a known symbol P[i] is "j", in terms of polarity, the intermediate real part $L'_{Re}[i]$ of L[i] is kept unchanged while the intermediate imaginary part $L'_{Im}[i]$ is reversed, and they are used as the real and imaginary parts $L_{Re}[i]$ and $L_{Im}[i]$ for L[i], respectively, i.e., $L_{Re}[i]=L'_{Re}[i]$ and $L_{Im}[i]=-L'_{Im}[i]$. When the determined position of a known symbol P[i] is "−j", in terms of polarity, the intermediate real part $L'_{Re}[i]$ of L[i] is reversed while the intermediate imaginary part $L'_{Im}[i]$ is unchanged, and they are used as the real and imaginary parts $L_{Re}[i]$ and $L_{Im}[i]$ for L[i], respectively, i.e., $L_{Re}[i]=-L'_{Re}[i]$ and $L_{Im}[i]=L'_{Im}[i]$.

In this way, the first calculator 630 can calculate the local reference signal $S_{local\_ref}$ from the known signal.

The second calculator 640 utilizes the determined position of each known symbol to assign the value for a corresponding interchange indicator. In the embodiment as shown in Table 1, the corresponding interchange indicator is assign as "0" when the determined position of the known symbol lies in the real axis, that is, "1" or "−1", and the corresponding interchange indicator is assign as "1" when the determined position of the known symbol lies in the imaginary axis, that is, "j" or "−j".

In the embodiment shown in FIG. 3, the interchangers in the processor 330 each have a corresponding interchange indicator. When the value of the interchange indicator is "0", the interchanger doesn't interchange the adjusted real and imaginary part components and outputs them as processed real and imaginary parts, that is, $R''_{Re}[1]=R'_{Re}[1]$ and $R''_{Im}[1]=R'_{Im}[1]$; when the value of the interchange indicator is "1", the interchanger interchanges the adjusted real and imaginary part components and outputs them as processed real and imaginary parts, that is, $R''_{Re}[2]=R'_{Im}[2]$ and $R''_{Im}[2]=R'_{Re}[2]$.

In the method provided in the present invention, the shifter and adder are utilized instead of the multiplier to implement the complex correlation algorithm for two complex signals and hence reduce the size of a chip to a great extent. Taking FPGA with a clock of 20 MHz as example, one 16-bit shifter occupies one slice, i.e., about 100 or more logic gates, one 16-bit adder occupies about 100 or more logic gates, and one 16-bit multiplier takes up about 1000 or more logic gates. In a conventional complex multiplier, correlation for one received symbol requires 4 real multipliers and 2 adders, that is, about 4000 or more logic gates. With the complex to signal correlator of the present invention, however, the same correlation for one received symbol requires only 2 shifters and 3/N adders on average, that is; about 200 to 300 logic gates, and the 3 adders are shared by N received symbols. It is obvious from the example of FPGA with a clock of 20 MHz that the required number of logic gates can be remarkably reduced by using the method and apparatus in the present invention.

To those skilled in the art, it should be appreciated that various modifications can be made to the algorithm for complex signal correlation and the complex signal correlator disclosed in the present invention, and thus the scope of the invention should be defined by the content of appended claims.

The invention claimed is:

1. A correlation method for complex signal, which is designed for processing one received signal and comprises steps of:
   a) for each received symbol in said received signal, adjusting respectively the amplitude and radial angle of said received symbol based on one corresponding local reference symbol in one corresponding local reference signal so as to generate one corresponding adjusted received symbol;
   b) rotating the radial angle of each adjusted received symbol based on one corresponding interchange indicator so as to generate one corresponding processed received symbol; and
   c) combining all of said processed received symbols to obtain one complex correlation signal.

2. The method according to claim 1, wherein in said step a), based on the real part and the imaginary part of said local reference symbol, adjusting respectively the real part and the imaginary part of said received symbol by means of shifting so as to generate the amplitude and radial angle of said adjusted received symbol.

3. The method according to claim 1, wherein in said step b), the real part and the imaginary part of each of said adjusted received symbols are interchanged for rotation based on one corresponding interchange indicator so as to adjust said radial angle of said adjusted received symbol.

4. The method according to claim 1, further comprising step of:
   d) calculating said local reference signal based on one known signal, wherein said known signal includes a plurality of known symbols.

5. The method according to claim 4, wherein said step d) further comprises steps of:
   i) determining the position for each of said known symbols relative to a real axis and an imaginary axis in a complex plane;
   ii) deciding the value of one corresponding interchange indicator based on said determined position;
   iii) calculating said one local reference symbol corresponding to said known symbol based on the real and imaginary parts of said known symbol as well as said determined position.

6. The method according to claim 5, wherein said step i) further comprises step of rotating said known symbol to the closest real or imaginary axis so as to obtain said determined position.

7. The method according to claim 5, wherein said step ii) further comprises steps of:
   I) assigning said interchange indicator as false if said determined position lies at said real axis;
   II) assigning said interchange indicator as true if said determined position lies at said imaginary axis.

8. The method according to claim 5, wherein said step iii) further comprises steps of:
   I) calculating respectively the intermediate real part and the intermediate imaginary part of said local reference symbol based on the real and imaginary parts of said known symbol;
   II) reversing respectively the polarities of said intermediate real part and said intermediate imaginary part based on said determined position so as to generate the real and imaginary parts of said local reference symbol.

9. The method according to claim 8, wherein in said step I), said intermediate real part and said imaginary part are equal to $\lceil \log_2 |P[i]| \rceil$, and $P[i]$ represents said symbol of said known signal, $|P[i]|$ represents the amplitude of said $P[i]$, and $\lceil X \rceil$ represents the minimum integer equal to or greater than X.

10. The method according to claim 8, wherein in said step I), said intermediate real part and said imaginary part are equal to $\lceil \log_2 |P_{Re}[i]| \rceil$ and $\lceil \log_2 |P_{Im}[i]| \rceil$, respectively, and $P[i]$ represents said symbol of said known signal, $|P[i]|$ represents the amplitude of said $P[i]$, and $\lceil X \rceil$ represents the minimum integer equal to or greater than X.

11. The method according to claim 8, wherein said step II) further comprises steps of:
   A) if said determined position lies at the positive part of said real axis, maintaining the polarities of said intermediate real part and said intermediate imaginary part as the real and imaginary parts of said local reference symbol, respectively;
   B) if said determined position lies at the negative part of said real axis, reversing the polarity of said intermediate real part and maintaining the polarity of said intermediate imaginary part as the real and imaginary parts of said local reference symbol, respectively;
   C) if said determined position lies at the positive part of said imaginary axis, reversing the polarities of said intermediate real part and said intermediate imaginary part as the real and imaginary parts of said local reference symbol, respectively; and
   D) if said determined position lies at the negative part of said imaginary axis, reversing the polarity of said intermediate imaginary part and maintaining the polarity of said intermediate real part as the real and imaginary parts of said local reference symbol, respectively.

12. The method according to claim 1, wherein said step b) further comprises steps of:
   i) maintaining the radial angle of said adjusted received symbol unchanged if the value of said interchange indicator is false; and
   ii) interchanging the real and imaginary parts of said adjusted received symbol to rotate its radial angle if the value of said interchange indicator is true.

13. The method according to claim 1, wherein said step c) further comprises steps of:
   to i) combining the real and imaginary parts of each of said processed received symbols to generate one corresponding intermediate complex signal; and
   ii) combining all of said intermediate complex signals to obtain said complex correlation signal.

14. The method according to claim 1, wherein said step c) further comprises steps of:
   i) combining the real parts of all of said processed received symbols to generate one combined real part component;
   ii) combining the imaginary parts of all of said processed received symbols to generate one combined imaginary part component; and
   iii) combining said combined real part component and said combined imaginary part component to obtain said complex correlation signal.

15. A complex signal correlator for detecting one received signal, comprising:
   a first memory for storing said received signal which includes a plurality of received symbols;
   a second memory for storing one local reference signal which includes a plurality of local reference symbols;
   a processor for processing said received signal based on said local reference signal to generate a processed received signal and comprising a plurality of shifter pairs and a plurality of interchangers, wherein each shifter pair includes two shifters and is configured to adjust the amplitude and radial angle of one of said received symbols correspondingly based on the real and imaginary parts of one of said local reference symbols so as to generate correspondingly one adjusted received symbol, and each interchanger. is configured to rotate the radial angle of said adjusted received symbol based on the value of one corresponding interchange indicator so as to generate one processed received symbol; and
   a complex signal synthesizer for combining all of said processed received symbols to obtain one complex correlation signal.

16. The complex signal correlator according to claim 15, further comprising:
   a third memory for storing one known signal which includes a plurality of known symbols;
   a position determiner for determining the position of each of said known symbols relative to the real and imaginary axes in a complex plane;
   a first calculator for calculating the real and imaginary parts of one of said local reference signal correspondingly based on the real and imaginary parts of each of said known symbols as well as said determined position; and
   a second calculator for calculating the value of one corresponding interchange indicator based on said determined position, wherein a corresponding interchanger rotates the radial angle of a corresponding adjusted received symbol based on the value of said interchange indicator.

17. The complex signal correlator according to claim 15, wherein said complex signal synthesizer further comprises:
- a first adder for combining the real parts of all of said processed received symbols to generate the real part component of said complex correlation signal;
- a second adder for combining the imaginary parts of all of said processed received symbols to generate the imaginary part component of said complex correlation signal; and
- a complex signal synthesizer for combining said real part component and said imaginary part component to generate said complex correlation signal.

18. The complex signal correlator according to claim 15, wherein said complex signal synthesizer further comprises:
- a plurality of complex signal synthesizers, each for combining the real and imaginary parts of one corresponding processed received symbols to generate one intermediate complex signal; and
- a complex signal adder for combining all of said intermediate complex signals to obtain said complex correlation signal.

19. A receiver for wireless communication system, comprising:
- a front-end processor for receiving a radio frequency signal and converting it into a received signal;
- a complex signal correlator for processing said received signal to obtain a complex correlation signal and comprising:
  - a first memory for storing said received signal which includes a plurality of received symbols;
  - a second memory for storing one local reference signal which includes a plurality of local reference symbols;
  - a processor for processing said received signal based on said local reference signal to generate a processed received signal and comprising a plurality of shifter pairs and a plurality of interchangers, wherein each shifter pair includes two shifters and is configured to adjust the amplitude and radial angle of one of said received symbols correspondingly based on the real and imaginary parts of one of said local reference symbols so as to generate correspondingly one adjusted received symbol, and each interchanger is configured to rotate the radial angle of said adjusted received symbol based on the value of one corresponding interchange indicator so as to generate one processed received symbol; and
  - a complex signal synthesizer for combining all of said processed received symbols to obtain one complex correlation signal; and
- a detector for detecting correlation peak from said complex correlation signal to detect reception synchronization.

20. The receiver according to claim 19, wherein said complex signal correlator further comprises:
- a third memory for storing one known signal which includes a plurality of known symbols;
- a position determiner for determining the position of each of said known symbols relative to the real and imaginary axes in a complex plane;
- a first calculator for calculating the real and imaginary parts of one of said local reference signal correspondingly based on the real and imaginary parts of each of said known symbols as well as said determined position; and
- a second calculator for calculating the value of one corresponding interchange indicator based on said determined position, wherein a corresponding interchanger rotates the radial angle of a corresponding adjusted received symbol based on the value of said interchange indicator.

* * * * *